United States Patent [19]

Price, Jr.

[11] Patent Number: 4,977,736
[45] Date of Patent: Dec. 18, 1990

[54] METHOD AND APPARATUS FOR HARVESTING FRUIT CROPS FROM BUSHES OR THE LIKE

[76] Inventor: Stanley J. Price, Jr., 4344 Brownsville Rd., Pittsburgh, Pa. 15236

[21] Appl. No.: 377,525

[22] Filed: Jul. 10, 1989

[51] Int. Cl.⁵ .............................................. A01G 19/00
[52] U.S. Cl. ....................................................... 56/330
[58] Field of Search ........................ 56/328.1, 329, 330

[56] References Cited

U.S. PATENT DOCUMENTS

| | | | |
|---|---|---|---|
| 3,596,457 | 8/1971 | Van Tine | 56/330 |
| 4,250,700 | 2/1981 | Horn et al. | 56/330 |
| 4,750,322 | 6/1988 | Korthuis | 56/328.1 |

FOREIGN PATENT DOCUMENTS

| | | | |
|---|---|---|---|
| 2359572 | 3/1978 | France | 56/330 |
| 2370418 | 7/1978 | France | 56/330 |
| 2371133 | 7/1978 | France | 56/330 |

Primary Examiner—William P. Neuder
Attorney, Agent, or Firm—Stanley J. Price, Jr.

[57] ABSTRACT

A method and apparatus are disclosed for harvesting fruit crops from bushes or bushy plants and, in particular, for harvesting grapes from a bush-like vine that has a plurality of arms or branches extending from a main stem and includes inserting a dislodging member into the bush-like vine from above between the arms and main stem and moving the dislodging member toward and away from the main stem to shake the grapes from the vine.

12 Claims, 4 Drawing Sheets

METHOD AND APPARATUS FOR HARVESTING FRUIT CROPS FROM BUSHES OR THE LIKE

BACKGROUND OF THE INVENTION

1. Field of the Invention

This invention relates to a method and apparatus for harvesting fruit crops that grow on bushes or the like and, more specifically, to a method and apparatus for harvesting grapes or berry-like fruit crops from bushes or bush-like vines that are not trained or supported on elevated guide wires. In particular, the invention is concerned with harvesting grape crops that grow within the inner confines of bushy or bush-like plants such that they are not capable of efficient mechanical harvesting by known apparatus or methods. Accordingly, since the invention is particularly directed to the harvesting of grapes from bushy plants or bush-like vines, the following description will be directed specifically to the harvesting of such crops, it being understood, of course, that the invention is not intended to be so limited and can be applied to harvesting other crops that similarly grow within the inner confines of bushes, bushy plants, bush-like vines or the like.

2. Description of the Prior Art

Apparatus and method for harvesting fruit crops, such as grapes, berries and the like, are numerous and include those disclosed in U.S. Pat. Nos. 1,277,715; 1,360,473; 1,632,597; 2,893,194; 3,184,908; 3,245,211; 3,325,984; 3,380,236; 3,413,789; 3,439,478; 3,478,501; 3,596,457; 3,616,630; 3,939,629; and 3,959,959, the disclosures of which are incorporated herein by reference. In particular, the mechanical harvesting of grapes from trained vines supported from guide wires is known. For example, U.S. Pat. No. 3,439,478 discloses apparatus that straddles a row of grape vines and has a plurality of vertical shaker devices that strike the sides of the vines and dislodge the grapes therefrom. The striking devices swing toward the inner portions of the vines and, by the generally horizontal movement of the striking devices, dislodge the bunches of grapes that are positioned on the outer portions of the vine. The harvesting device described in U.S. Pat. No. 3,439,478 efficiently harvests substantially all of the grapes from trained vines that are supported on wires that extend longitudinally along a row.

The dislodged grapes fall onto longitudinal conveyors positioned in the harvesting device, on opposite sides of the row of vines, and the harvested grapes are conveyed to a suitable elevated discharging device that discharges the harvested grapes into a receiver.

Another type of grape harvesting device is disclosed in U.S. Pat. No. 3,380,236 and includes a machine that moves by longitudinally extending wires. This harvesting device includes a rotor member having generally horizontally extending members that engage the wire and, thus, shake the vines to dislodge the grapes therefrom. The dislodged grapes fall onto a conveying device positioned below the vine and are conveyed to an elevated discharging device.

Although both of the above described harvesting devices work efficiently when the grape vines are trained and supported on longitudinal guide wire, they do not and cannot harvest substantially all of the grapes that are grown on bush-like vines. In certain vineyards the vines are not trained along supporting or guide wires and merely grow as bush-like vines. The bush-like vines include a main stem or trunk that has a plurality of main branches or arms extending outwardly therefrom. The main branches or arms are relatively thick and sturdy and grow generally horizontally from the trunk. Shoots sprout from the main branches or arms and the bunches of grapes grow from the shoots. The shoots extend from the main branches in random order; and a substantial number of the shoots grow inwardly so that they are positioned between the trunk and the ends of the main branches, as viewed from above the bush-like vine. Therefore, the main branches or arms are positioned between the outer side portions of the bush-like vine and the growth of a substantial portion of the bunches of grapes.

Since the bush-like vines are not supported from wires, the apparatus disclosed in U.S. Pat. No. 3,380,236 is ineffective in harvesting the grapes from the bush-like vines. The apparatus disclosed in U.S. Pat. No. 3,439,478 applies a striking force against the sides of the vines and is ineffective in harvesting the bunches of grapes growing on the shoots extending inwardly from the main branches or arms toward the center of the bush-like vine. The dislodging apparatus of U.S. Pat. No. 3,439,478 strikes the ends of the relatively rigid main branches or arms and is ineffective in dislodging the grapes growing on the shoots inwardly of the ends of the main branches or arms.

Accordingly, there is a need for a method and apparatus for harvesting fruit crops that grow on interior portions as well as exterior portions of bushes, bush-like vines or the like. In particular, there is a need for a method and apparatus to harvest grapes from bush-like vines that are not supported by and trained along trellis wires. There is a further need for a method and apparatus to mechanically harvest the grapes positioned within the confines of the bush-like vine with the main branches or arms positioned between the bunches of grapes and the side portions of the bush-like vine. There is also a need to continuously harvest the grapes from the bush-like vines without causing substantial damage to the main branches and trunk of the bush-like vine.

SUMMARY OF THE INVENTION

This invention is directed to a method and apparatus for harvesting fruit crops from bushes or bushy plants and, in particular, for harvesting grapes from a bush-like vine that has a plurality of arms or branches extending from a main stem and includes inserting a dislodging member into the bush-like vine from above and moving the dislodging member toward and away from the main stem to shake the grapes from the vine.

The apparatus for harvesting the fruit crops and, in particular, for harvesting grapes from a bush-like vine includes a generally inverted U-shaped framework that straddles the bush-like vine and further includes at least one rotatable member mounted on the framework with the axis of the rotatable member positioned above the bush-like vine. The rotatable member has a plurality of spoke-like dislodging members extending radially therefrom. The spoke-like members are arranged to be inserted into the bush-like vine from above and to penetrate the bush-like vine at locations between the main stem and the ends of the main branches or arms. Means are provided to propel the framework along rows of bush-like vines and means are also provided to reciprocate the rotatable member axially so that the spoke-like members inserted in the bush-like vine strike the main stem and the inner portion of the arms and branches to vibrate the vine and even strike the bunches of grapes between the main stem and the branches thereby dislodging the bunches of grapes from the vine. The rotatable member can be freely rotatable or it may be powered to provide positive rotation.

Moreover, the apparatus may include a plurality of rotatable members arranged in tandem on opposite sides of the main stem or it may include a plurality of rotatable members positioned on opposite sides of the main stem in different spaced relation to the main stem so that the spoke-like members penetrate the bush-like vine at different distances from the main stem.

With this apparatus the spoke-like members penetrate the inner portions of the bush-like vine to dislodge the bunches of grapes growing adjacent to the main stem and between the main stem and the ends of the main branches or arms. The spoke-like members further impart an outward movement to the dislodged grapes to convey the grapes to the sides of the framework where the grapes fall onto a pair of longitudinally extending conveyors.

One of the features of this invention is to provide an improved method and apparatus for harvesting fruit crops from bushy or bush-like plants. Another feature of this invention is to provide a method and apparatus for inserting dislodging members into bush-like vines from above and dislodging bunches of grapes therefrom. An additional feature of this invention is to provide a method and apparatus for inserting a plurality of dislodging members into a bush-like vine without causing substantial damage to the main stem and arms of the bush-like vine.

These and other objects, features and advantages of this invention will become more apparent from the following description when taken in conjunction with the drawings and the appended claims.

DESCRIPTION OF PREFERRED EMBODIMENTS

Figure 1:
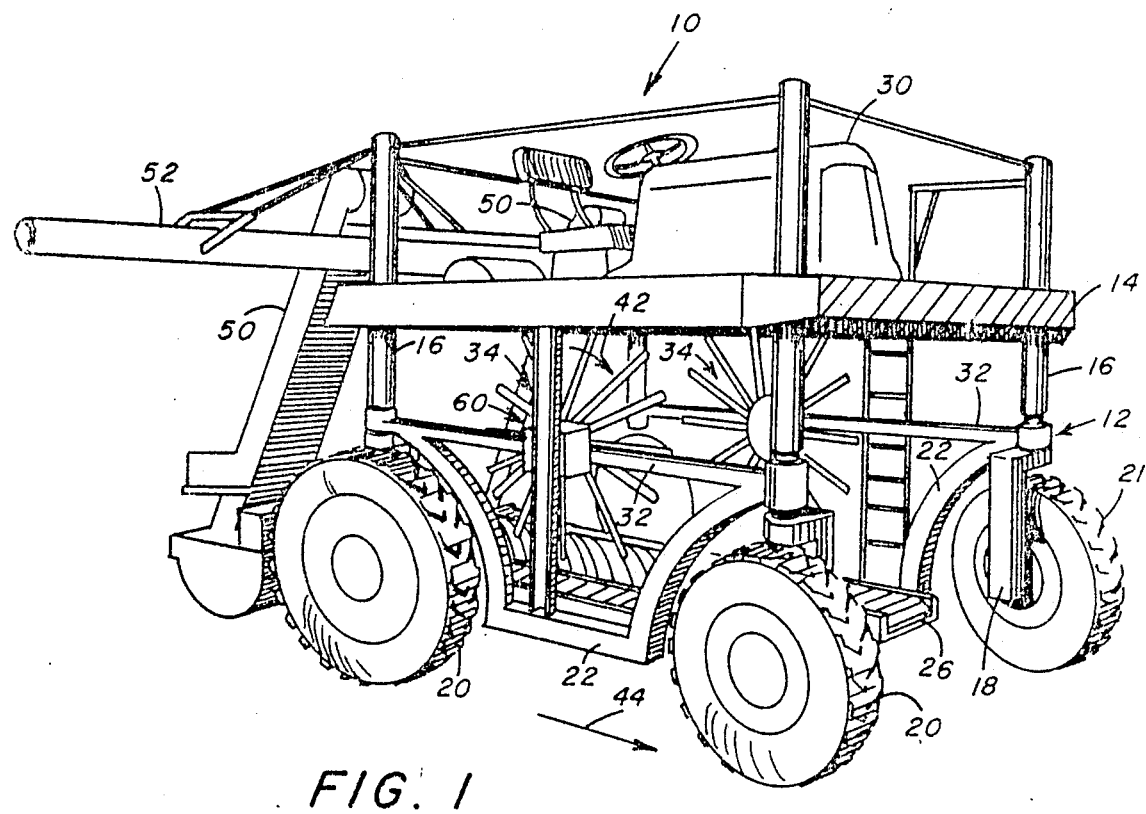
FIG. 1 is generally a side perspective view of a typical harvesting apparatus of this invention, with side plate portions removed for the sake of illustrating a pair of spoke-like dislodging members rotatably supported on the apparatus.
Figure 2:
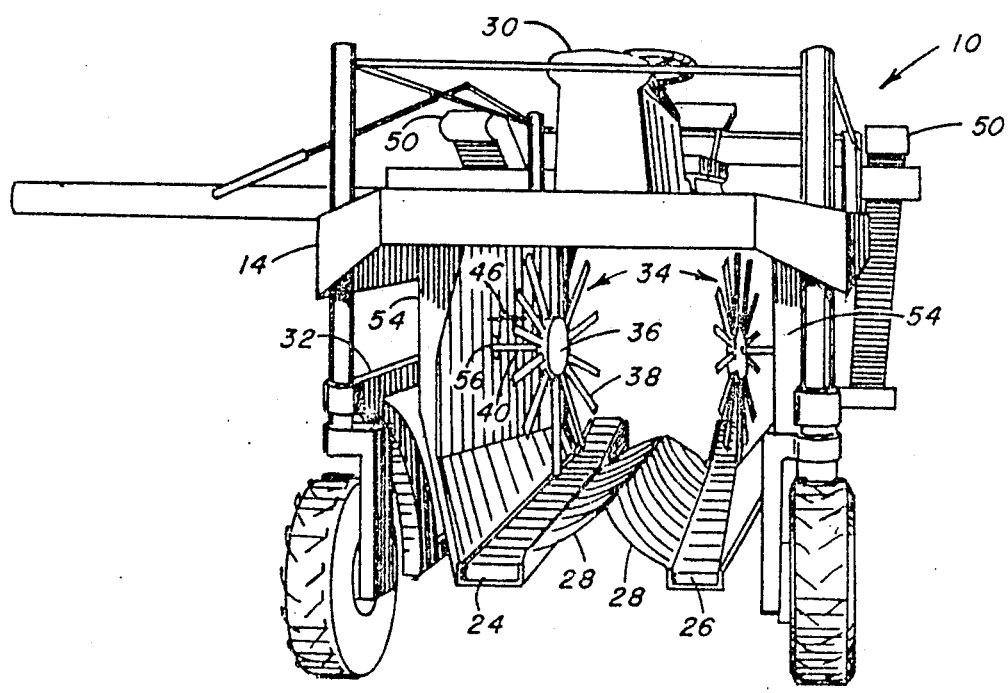
FIG. 2 is generally a front perspective view of the harvesting apparatus of FIG. 1 illustrating further details of the apparatus and the pair of rotatable spoke-like dislodging members.

Referring to the drawings and particularly FIGS. 1 and 2, there is illustrated one embodiment of my improved grape harvesting apparatus that is generally designated by the numeral 10. The harvesting apparatus 10 includes a generally inverted U-shaped framework 12 which, in turn, includes a rectangular frame 14 having four vertical post members 16 secured at the corners and depending downwardly therefrom. The post members have wheel supporting portions 18 extending from the bottom with wheels 20 mounted thereon. The wheel supporting portions 18 are rotatable relative to the posts 16 to steer the apparatus 10. Where desired, to accommodate uneven terrain, the wheel supporting members 18 may be suitably connected to a piston-cylinder arrangement, not shown, to extend the wheel supporting portions 18 relative to the posts 16 and, thus, compensate for inclined terrain.

Connected to the depending post members 16 are base members 22 which are arranged to support longitudinally extending conveyors 24 and 26 and leaf members 28. The leaf members 28 are pivotally or otherwise secured to the base members 22, on opposite sides of the grape harvester apparatus 10, and permit the harvester apparatus to straddle the bush-like vines and have the stems pass therebetween. The general arrangement of the longitudinal conveyors 24 and 26 and the leaf members 28 is disclosed in U.S. Pat. No. 3,349,478.

Figure 5:
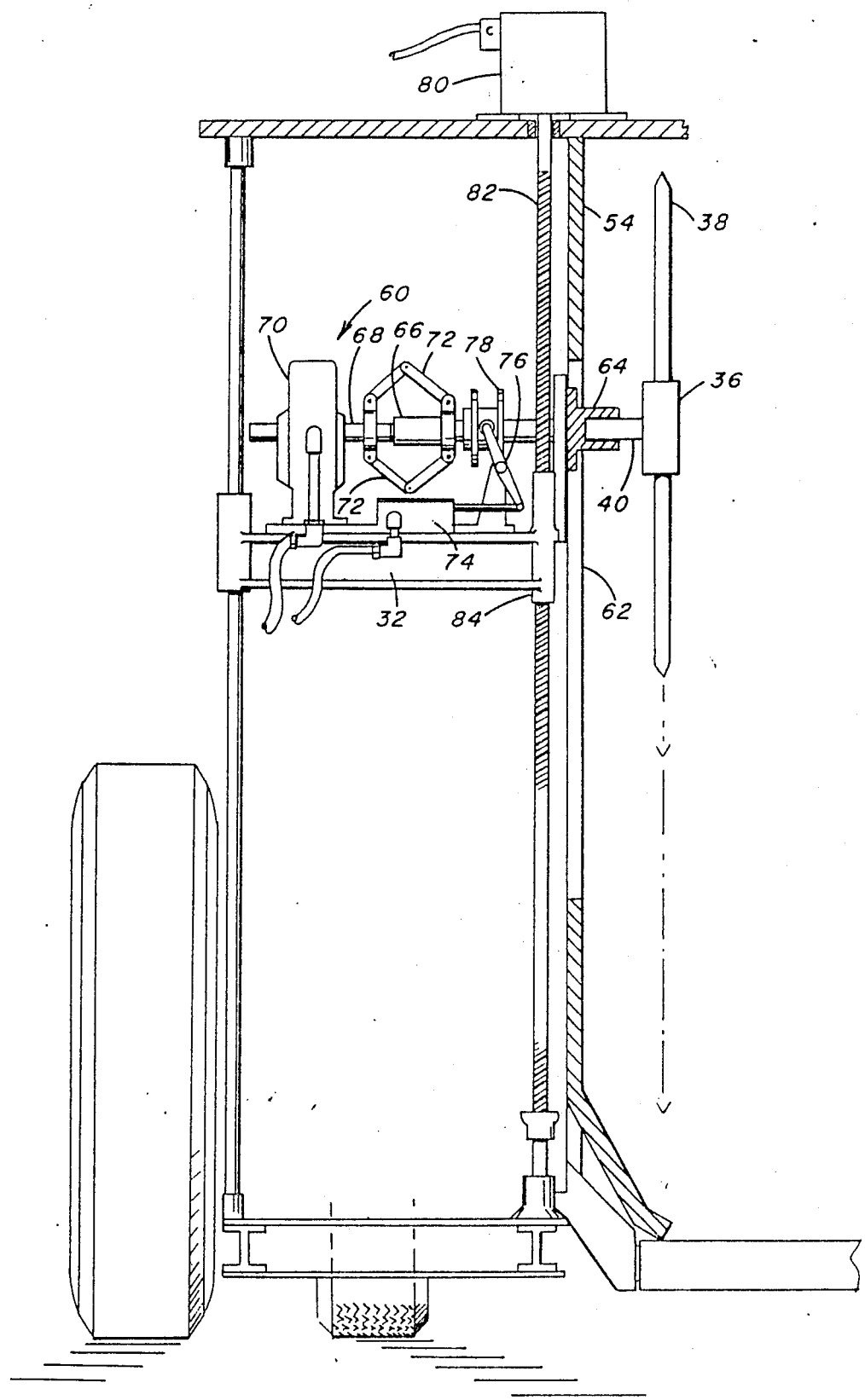
FIG. 5 is a schematic, partly sectional view of a support and drive device suitable for providing free rotation or powered rotation and reciprocation of the rotatable spoke-like dislodging members.

An engine 30 is mounted on a platform secured to the frame 14 and supplies the drive for the wheels 20 to propel the vehicle and also provides power for other portions of the grape harvester apparatus. Longitudinally extending members 32 are suitably connected to the post members 16 and mounted thereon are support and drive devices, generally designated by the numeral 60, for the grape dislodging apparatus. One embodiment of a suitable support and drive device is illustrated in FIG. 5 and will be explained in detail hereinafter. Also, as shown in FIG. 2, side plates 54 depend downwardly from frame 14 and are interposed between longitudinally extending members 32 and the grape dislodging devices 34.

The grape dislodging devices include a hub member 36 with a plurality of spoke-like members 38 extending radially outwardly therefrom. The hub member 36 is mounted on a shaft 40 which extends through a suitable aperture 56 in side plates 54 (FIG. 2) and is supported and driven by suitable apparatus as for example, the apparatus later described. The dislodging apparatus is arranged to rotate in a clockwise direction, as viewed in FIG. 1 and indicated by the arrow 42, with the vehicle being arranged to move in the direction by the arrow 44. Thus, the spokes 38 of the dislodging device rotate forwardly in the same direction as the direction of travel of the vehicle. The pair of dislodging devices 34, illustrated in FIGS. 1 and 2 is arranged to be positioned on opposite sides of the row of vine stems and between the stems and the ends of the outwardly extending arms, i.e., between the stems and the side portion of the arms facing the stems. The shaft 40 is arranged to reciprocate horizontally in the direction indicated by the double ended arrow 46 shown in FIG. 2.

With this arrangement, the vehicle advances generally rectilinearly along a row of bush-like vines with the vine stems or trunks passing between the leaf members 28. The spoke members 38 of the dislodging device penetrate the bush-like vines from above to a location between the stem and the ends of the arm members of the vine. Reciprocation of the shaft 40 moves the spokes 38 toward and away from the vine stem or trunk and dislodges the bunches of grapes growing from the shoots located between the stem and the ends of the arms. The reciprocation of the dislodging devices 34 will also dislodge the bunches of grapes growing on the outside or ends of the arms away from the trunk. Where desired, devices, such as those illustrated in U.S. Pat. No. 3,439,478, may be employed in conjunction with the dislodging devices 34 to remove the bunches of grapes growing on the arms or shoots on the outside or ends of the arms.

After the grapes are dislodged by the dislodging devices 34, they fall by gravity onto the longitudinal conveyors 24 and 26 and are conveyed rearwardly of the vehicle and, then, upwardly by conveyors 50 to an elevated position where the grapes are then conveyed horizontally by a conveyor 52 to a suitable receiver device, not shown. With this arrangement, the grapes are harvested from the bush-like vines and deposited in a receiver positioned adjacent thereto.

Figure 3:
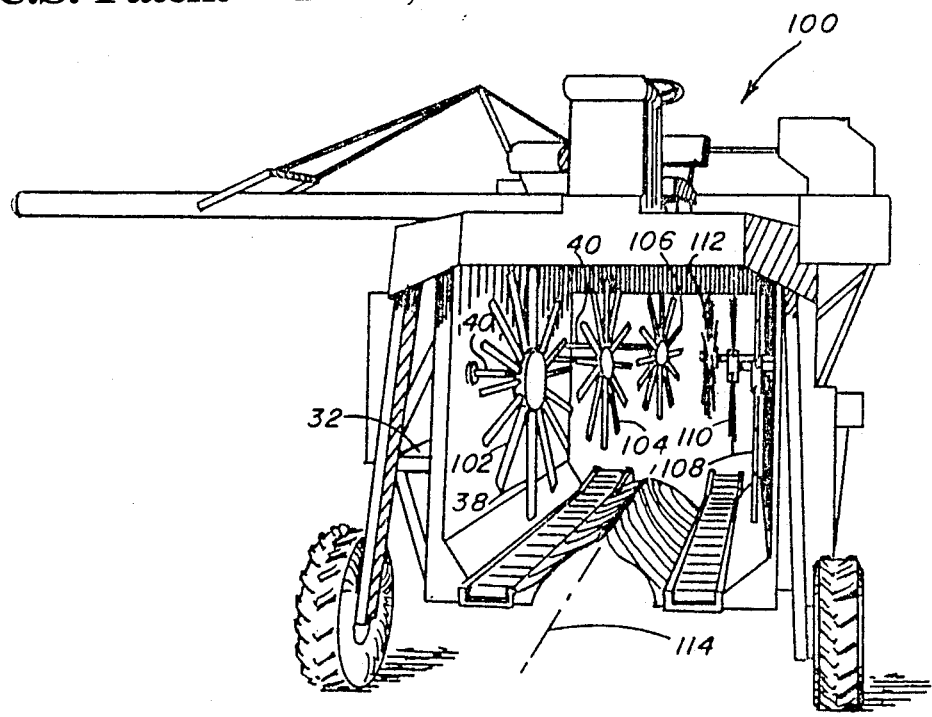
FIG. 3 is a perspective view similar to FIG. 2 illustrating a typical harvesting apparatus with three spoke-like dislodging members rotatably supported on each side of the apparatus and arranged in a generally converging configuration.

In FIG. 3, another embodiment of my grape harvesting device is illustrated and, in this and subsequent figures of drawings, the same parts will be referred to by the same numerals as used with the harvester illustrated in FIG. 1. The frame structure and propelling device for the harvesting apparatus, illustrated in FIG. 3 and designated by the numeral 100, are substantially the same as in FIG. 1. Mounted on one transverse member 32 are three dislodging devices, designated by the numerals 102, 104 and 106, which are rotatably mounted on one side of the vehicle 100. On the opposite side of the vehicle, three dislodging devices are designated 108, 110 and 112 are rotatably mounted on the other transverse member 32. The dislodging devices 102-112 are substantially the same as the dislodging devices 34 illustrated and described in my embodiment of FIGS. 1 and 2. The dislodging devices, however, are positioned in converging relation to each other so that the oppositely positioned dislodging devices 102 and 108 are spaced at a preselected distance from the longitudinal axis of the harvesting apparatus which is indicated by a -.- and designated 114. The second pair of dislodging devices 104 and 110 have elongated shaft portions 40 so that the dislodging devices are positioned closer to the longitudinal axis 114 of the vehicle 100. The third pair of dislodging devices 106 and 112 are positioned closer to the longitudinal axis 114 so that the three dislodging devices 102-106 and the three dislodging devices 108-112 converge toward the longitudinal axis 114 and, thus, the spokes 38 will penetrate the bush-like vines at different distances from the stem or trunk portions of the vines. The shaft portions 40 of each of the dislodging devices 102-112 are arranged to reciprocate and, thus, dislodge the grapes growing on the bush-like vines.

Figure 4:
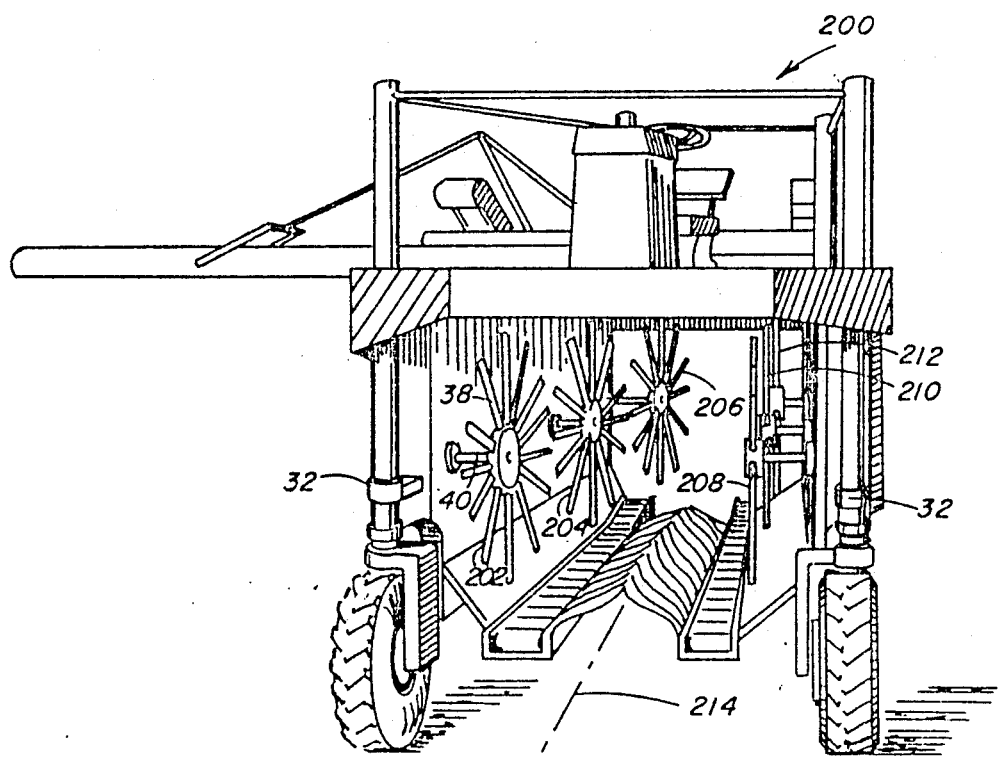
FIG. 4 is a perspective view similar to FIG. 2 illustrating a typical harvesting apparatus with three rotatable spoke-like dislodging members positioned in tandem relation.

Another embodiment of my grape harvesting device is illustrated in FIG. 4 and is designated by the numeral 200. In this embodiment, the dislodging devices 202, 204 and 206 rotatably mounted on one side of the vehicle 200, are in laterally spaced, parallel alignment with the longitudinal axis of the vehicle which is indicated by a -.- and designated 214. Similarly, the dislodging devices 208, 210 and 212, rotatably mounted on the other side of the vehicle 200, are in substantially identical, laterally spaced, parallel alignment with longitudinal axis 214, as are the dislodging devices 202, 204 and 206. The dislodging devices 202-212, as shown, are substantially the same construction as dislodging devices 34, previously described. Accordingly, with proper alignment of the vehicle 200 straddling a row of bush-like vines, the spokes 38 will penetrate the bush-like vines at substantially the same distance from and on either side of the stem or trunk portions of the vines. As with previous embodiments, the dislodging devices 202-212 are rotatably mounted on transverse members 32 and the shaft portion 40 of each of the dislodging devices 202-212 is arranged to reciprocate and, thus, dislodge the grapes growing on the bush-like vines. Using a plurality of dislodging devices 202-206 and 208-212 in tandem, as shown, provides supplementary assurance that all of the grapes to be harvested will be removed from the vines.

In accordance with this invention, in addition to reciprocating the dislodging devices, it is desired to provide for their rotational movement so that they readily penetrate deeply into and move freely along the rows of bush-like vines with minimum or no damage to the stems and arms of the vines. For this purpose, it is found that rotation may be provided either by free rotation or by powered rotation, as desired. Accordingly, it will be appreciated that it would be advantageous, although it is not necessarily required, to provide a suitable support and drive device for my dislodging devices that selectively permits either free rotation or powered rotation, along with reciprocation of these devices, such that the desired mode of operation may be selected at will. Additionally, it is found that it may also be advantageous or desirable to be able to adjust the elevation of the dislodging devices above the adjacent ground level in order to be able to accommodate bush-like vines to different height for entry from above. Accordingly, I will now describe a suitable arrangement for carrying out the above desiderata. It should be understood that the invention is not limited to the following arrangement and over known devices may be employed to provide reciprocation and where desired rotation to the dislodging devices.

Turning now to FIG. 5, there is illustrated an embodiment of a suitable support and drive device or drive mechanism 60 for permitting free rotation or imparting powered rotation, along with imparting reciprocating movement, to the dislodging devices 34, 102-112 and 202-212 of this invention. As aforesaid, each of the above mentioned dislodging devices basically includes a hub member 36 mounted on a shaft 40 and having a plurality of spoke-like members 38 extending radially therefrom. In the embodiment shown, shaft 40 of each dislodging device extends outwardly through an elongated slot or aperture 62 in a side plate 54. Mounted on drive support member 32 is a bearing 64 through which shaft 40 extends. On the free end of shaft 40 there is affixed one end of an elongated sleeve 66 which, in turn, slidingly receives in its other end the drive shaft 68 of a motor 70, also mounted on drive support member 32. As shown, fixedly clamped to drive shaft 68 and shaft 40, where it adjoins sleeve 66, are pairs of articulatedly pinned toggle linkages 72. The purpose of these linkages 72 are to transmit the rotation of drive shaft 68 to shaft 40, during powered rotation, which contemporaneously permitting sleeve 66 and shaft 40 to reciprocate to the right and left, as viewed, and, at the same time, to retain sleeve 66 in sliding engagement with drive shaft 68.

Reciprocating movement of shaft 40 and sleeve 66 is provided, as shown, by a fluid operated, double acting, piston cylinder assembly 74, a rocker arm assembly 76, both of which are mounted on drive support member 32, and a rocker arm follower 78 secured to shaft 40 intermediate the linkages 72 and bearing 64. As will be understood, alternating movement of the piston of piston cylinder assembly 74 will, through its piston rod, move one end of the rocker arm of assembly 76 alternately leftwardly and rightwardly, as viewed, causing the other end of the rocker arm, through its interaction with rocker arm follower 78, to reciprocate shaft 40 alternately to the right and left. In the embodiment shown, motor 70 is preferably hydraulically operated, as is also piston cylinder assembly 74.

From the foregoing description, it will be appreciated that contemporaneous powered rotation of motor 70 and powered reciprocation of the piston of piston cylinder assembly 74 will impart both powered reciprocation and rotation to the dislodging devices of this invention. On the other hand, by permitting motor 70 to stand idle while operating piston cylinder assembly 74 alone, free rotation of the dislodging devices is permitted while powered reciprocation is being carried out. Accordingly, in the case of free rotation, the dislodging devices are suitably constructed with sufficient spokes 38, of sufficient length, and are arranged with their axes disposed adjacent the upper extremities of the bush-like vines such that, as a harvesting apparatus of this invention traverses a row of vines, the spokes 38 continuously interact with the branches or arms of the vines to cause rotation of the dislodging devices and continuous interpenetration of successive spokes 38 into the inner reaches of the vines. In this manner there is provided a mechanism 60 for selectively permitting free rotation or powered rotation to the dislodging devices while contemporaneously imparting reciprocating movement thereto.

Also illustrated in FIG. 5 is a suitable mechanism for adjusting the elevation of the dislodging devices above the adjacent ground level in order to be able to accommodate bush-like vines of different height, if required. The mechanism includes a motor 80 driving a jack screw 82 that interacts with a threaded portion 84 affixed to drive support members 32 for the full extent of elongated slot 62. In such cases, of course, drive support members 32 are secured or connected to posts 16 in a manner to permit such change in their elevation.

Figure 6:
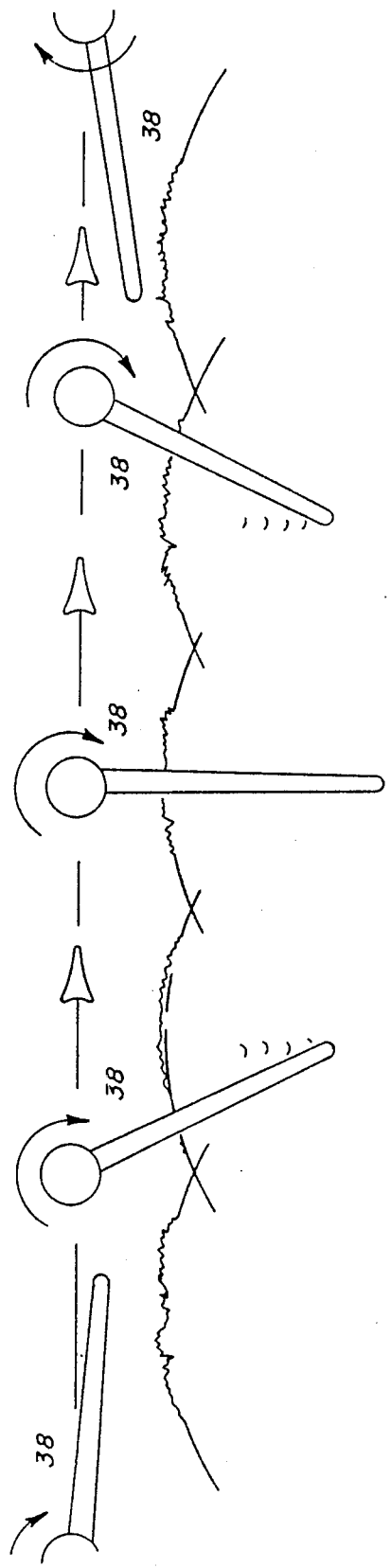
FIG. 6 is a diagrammatic representation of the manner in which the spoke-like dislodging member is inserted into the bush-like vine in a generally vertical manner during powered rotation.
Figure 7:
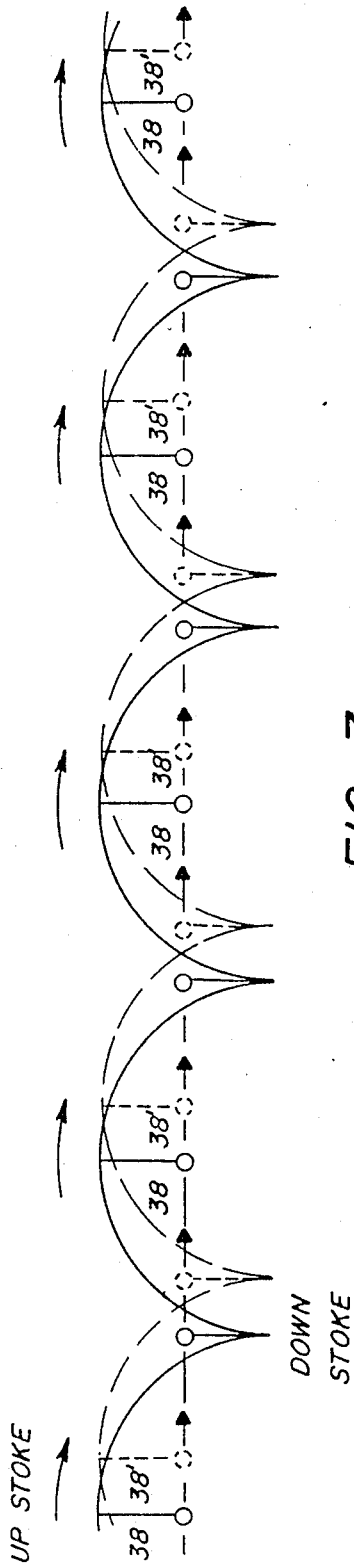
FIG. 7 illustrates diagrammatically the path followed by one spoke-like dislodging member and the next spoke-like member during powered rotation.

Shown in FIGS. 6 and 7, respectively, are the entry and exit angles and the paths taken by spokes 38 when, in a further aspect of this invention, the forward velocity of the harvester and the rotational velocity of the dislodging devices, in their driven mode, are controlled so that the forward velocity of the harvester is substantially equal to the tangential or rearward directed velocity component of the ends of spokes 38 when inserted vertically into a bush-like vine. As shown in FIG. 6, under the above conditions, spokes 38 enter into and exit from the bush-like vines at a very steep angle or substantially vertically. As further shown in FIG. 7, under such conditions, the paths taken by a spoke 38 (shown in full line) and a subsequent spoke 38 (shown in dotted line) are cycloidal or substantially cycloidal. The sum effect of the steep entry and exit of the spokes 38 and the cycloidal or substantially cycloidal path the spokes generate is that little, if any, damage is caused to the stems and arms or branches of the bush-like vines while they are being harvested. It is believed that the combination of the forward movement of the machine and rotation of the spokes results in the spokes entering the top of the vine from a substantially vertical position and penetrate substantially vertically into the bush-like vines. This, it is believed, contributes substantially to minimizing the damages to the bush-like vines.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for harvesting fruit from a bushy plant having a plurality of branches extending outwardly from a trunk comprising,
    positioning a dislodging member above a bushy plant,
    inserting at least a portion of a dislodging member downwardly from above between the ends of said branches and said trunk into said bushy plant, and
    after at least a portion of said dislodging member is inserted from above said bushy plant moving said dislodging member generally horizontally toward and away from said trunk to dislodge said fruit from said branches.

2. A method for harvesting fruit as set forth in claim 1 which includes,
    rotating said dislodging member along a general vertical path
    moving said dislodging member through said plant, along a generally vertical linear path, parallel to said trunk while rotating said dislodging member.

3. A method for harvesting fruit as set forth in claim 1 which includes,
    permitting said dislodging member to freely rotate while said dislodging member moves along a generally vertical linear path and moves through said plant as it traverses said vertical linear path.

4. A method for harvesting fruit as set forth in claim 1 which includes,
    imparting powered rotation to said dislodging member while said dislodging member moves along a generally vertical linear path and moves through said plant as it traverses said vertical linear path.

5. A method for harvesting fruit as set forth in claim 3 which includes,
    moving said dislodging member along said generally vertical linear path through said plant at a velocity substantially equal to the tangential, horizontal velocity component of a portion of said dislodging member extending generally vertically into said plant.

6. A method for harvesting fruit as set forth in claim 1 which includes,
    inserting at least portions of a plurality of spaced dislodging members from above into said bushy plant and on opposite sides of said trunk,
    moving said dislodging members toward and away from said trunk on opposite sides of said trunk while said dislodging members extend into said plant to dislodge fruit from said branches.

7. A method for harvesting fruit as set forth in claim 6 which includes,
    permitting said dislodging member to freely rotate while said dislodging member moves through said plant and as it traverses said path.

8. Apparatus for harvesting fruit from a row of bushy plants each having a plurality of branches extending outwardly from a trunk comprising, a frame member, conveyor means extending longitudinally along said frame member, a dislodging member supported on said frame member above said conveyor means, said dislodging member arranged to be inserted downwardly into said bushy plants, said dislodging member having a body portion with a plurality of spoke-like members extending therefrom, said dislodging member supported on said frame member with said spoke-like members parallel to said longitudinally extending conveyor means, and propelling means connected to said frame member for moving said frame member longitudinally along a path parallel to said row of bushy plants while moving portions of said dislodging member into and out of said plants along a generally linear path parallel to said trunk and further moving said dislodging member generally horizontally, toward and away from said trunk, to dislodge said fruit from said branches.

9. Apparatus for harvesting fruit as set forth in claim 8 in which, said propelling means includes means for moving portions of said dislodging member along said path through said plant at a velocity substantially equal to the tangential, horizontal velocity component of a portion of said dislodging member extending into said plant.

10. Apparatus for harvesting fruit as set forth in claim 8 which includes, means for inserting dislodging members downwardly from above into said bushy plant on opposite sides of said trunk.

11. Apparatus for harvesting fruit from a row of bushy plants each having a plurality of branches extending outwardly from a trunk comprising, moving a dislodging member along a path parallel to said row of bushy plants, inserting said dislodging member downwardly from above between the ends of said branches and said trunks of said bushy plants while moving said dislodging member along said path and while rotating said dislodging member, and moving said dislodging member horizontally toward and away from said trunks while rotating said dislodging member in a vertical plane to dislodge said fruit from said branches of said bushy plants.

12. A method for harvesting fruit from a bushy plant having a plurality of branches extending outwardly from a trunk comprising, inserting a plurality of spaced dislodging members downwardly from above between the end of the branches and the trunk along a generally vertical path from above and into said bushy plant on opposite sides of said trunk while rotating said dislodging members, and moving said dislodging members generally horizontally toward and away from each other on opposite sides of said trunk while said dislodging members extend into said plant to dislodge fruit from said branches.

* * * * *